United States Patent Office 3,732,148
Patented May 8, 1973

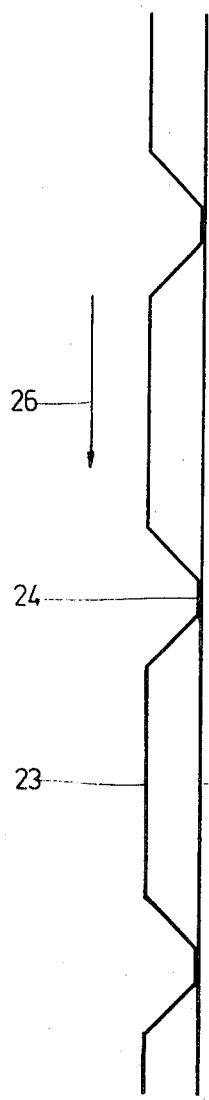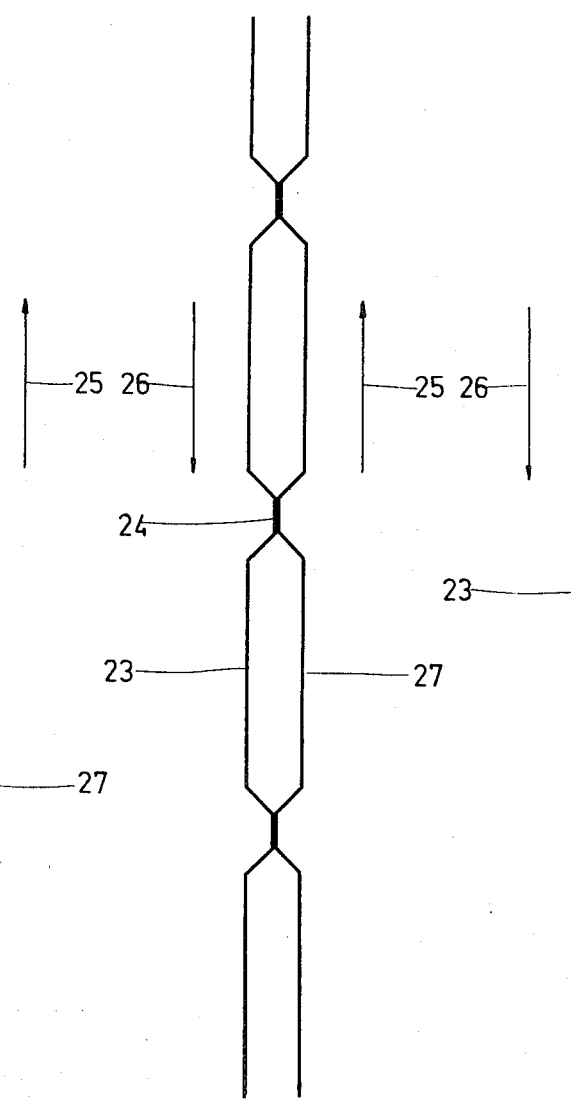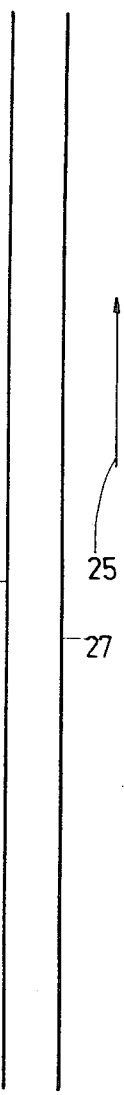

3,732,148
INDUSTRIAL PROCESS AND APPARATUS FOR CULTIVATING MICROORGANISMS
Sigismond Franckowiak, Montesson, Pierre Trambouze, Versailles, and Hugo Van Landeghem, Vienne, France, assignors to Institut Francais du Petrole des Carburants et Lubrifiants, Rueil-Malmaison, Hauts de Seine, France
Filed Dec. 10, 1969, Ser. No. 883,881
Claims priority, application France, Dec. 11, 1968, 177,774; July 7, 1969, 6923039
Int. Cl. C12b 1/14
U.S. Cl. 195—109      6 Claims

ABSTRACT OF THE DISCLOSURE

For aerating and cultivating microorganisms, there is provided an enclosure having a plurality of vertical partitions sub-dividing the enclosure into vertical elongated zones communicating with one another at their top and at their base. One group of the zones is fed with air at the base so as to carry the liquid phase of culture upwardly into a zone common to said group at the top where the air is at least partially separated from the liquid phase. Another group of the zones is not fed with air, but instead is used for the downward flow of the liquid phase, thereby obtaining continual circulation of the culture. At least some of the vertical partitions are hollow and provided with means for passing cooling liquid therethrough, the ratio between the total surface of the hollow partitions and the total volume of the vertical elongated zones delimited thereby being between 0.1 and 10 sq. meters per cubic meter, preferably between 0.5 and 2 sq. meters per cubic meter.

---

It is known that in industrial processes of cultivating microorganisms such as mushrooms, bacteria and more particularly yeasts, some problems arise concerning contacting the gaseous phases with liquid and, in some cases, solid phases.

For instance when growing a yeast strain on hydrocarbon substrates, the culture medium is formed of two immiscible liquid phases: an organic phase containing the hydrocarbons, particularly the straight-chain hydrocarbons which are assimilable by the yeasts and an aqueous phase mainly containing sources of nitrogen, phosphorus (for instance in the form of such ions as $NH_4^+$, $PO_4^{3-}$), essential ions such as magnesium, oligoelements, growing factors (for instance of the type of vitamin B).

The growing of yeasts, requiring, in addition, oxygen, it is essential to ensure a good contact of the yeast as well with the oxidizing gas (generally air) as with the two immiscible liquid phases.

Although such a contact is easily carried out when operating at the laboratory scale, this is no longer the case in industrial fermentation vessels having capacities of several tens of cubic meters and in some cases several hundreds of cubic meters.

This problem is also complicated by the fact that fermentations on hydrocarbon substrates liberate substantial amounts of heat.

By way of example one can compare the exothermal heat produced by the growth of a yeast in a fermentation reactor, e.g. with a cell division time of 3 hours, either on a carbohydrate such as glucose, or on a paraffinic hydrocarbon such as normal hexadecane, the heat evolved being respectively 380 and 780 kilocalories per 100 grams of cells.

Considering the case of a reactor for continuous operation whose cell concentration is maintained at a stable level of 15 g./l., the heat to be eliminated in order to stabilize the growth temperature of the yeast, will be respectively 13.2 and 27 kilocalories per liter of reactor capacity and per hour. It is an object of the present invention to provide an improved process and apparatus for carrying out, on an industrial scale, the culture of microorganisms on hydrocarbons substrates.

More generally, this invention relates to a process and an apparatus for cultivating microorganisms on a substrate of any origin, e.g. a substrate of hydrocarbons or carbohydrates.

The process of this invention consists of carrying out the culture of microorganisms in an enclosure comprising vertical partitions subdividing the enclosure in a number of vertical elongated zones interconnected at their top and their base, one group of said zones being fed with air at their base, so as to carry along the culture liquid phase upwardly, the other group of said zones being not fed with air and being used for the downward flowing of the liquid phase, at least one part of said vertical partitions being hollow and a cooling liquid passing therethrough, the ratio between the total surface of the hollow partitions and the total volume of the vertical elongated zones delimited thereby being between 0.1 and 10 m.² per m.³, preferably between 0.5 and 2 m.² per m.³.

The invention also relates to an apparatus formed of an enclosure comprising partition walls subdividing the enclosure in a number of vertical elongated zones interconnected at their tops and at their bases, and of air feeding means provided at the base of a group of said zones, a part at least of said vertical partitions being hollow so as to provide for the passage of a cooling fluid therethrough, the ratio of the total surface of the hollow partitions to the total volume of the elongated zones defined therebetween being between 0.1 and 10 m.² per m.³ and preferably between 0.5 and 2 m.² per m.³.

Preferably the mean thickness of the hollow partition is between 0.5 cm. and 20 cm.

The culture is conducted at a temperature between 25 and 45° C.

The apparatus further comprises at least one discharge duct for gases at its upper part, at least one inlet duct for liquids and at least one discharge duct for liquids.

The elimination of the heat evolved, as a result of the use of hydrocarbons in the fermentation, is carried out by providing the separating partitions between the zones of the apparatus with a double wall forming a space therebetween through which the cooling fluid, e.g. water is circulated.

These inner walls may be in the form of cylinders, such as those shown in FIGS. 1, 2, 5 and 6, or of rectangles, squares or any plane portion such as those shown in FIGS. 3 and 4.

It is advantageous to connect these double wall partitions in series or in parallel with respect to the direction of circulation of the cooling liquid.

Of course, in the same reactor, some of the partitions can be solid, i.e. with a single wall, and the others have a double wall but the reactor must be provided with at least two double-wall partitions.

The transfer of liquid from one enclosure to another and/or from one compartment to another may be effected in any manner, for instance through a hole in the partition, through a duct or a channel.

The invention will be further illustrated by the following description of various non-limitative embodiments, with reference to the accompanying drawings wherein:

FIGS. 5, 6 and 7 show in enlarged cross-sections, a portion of the hollow partition according to the invention.

Figure 1:
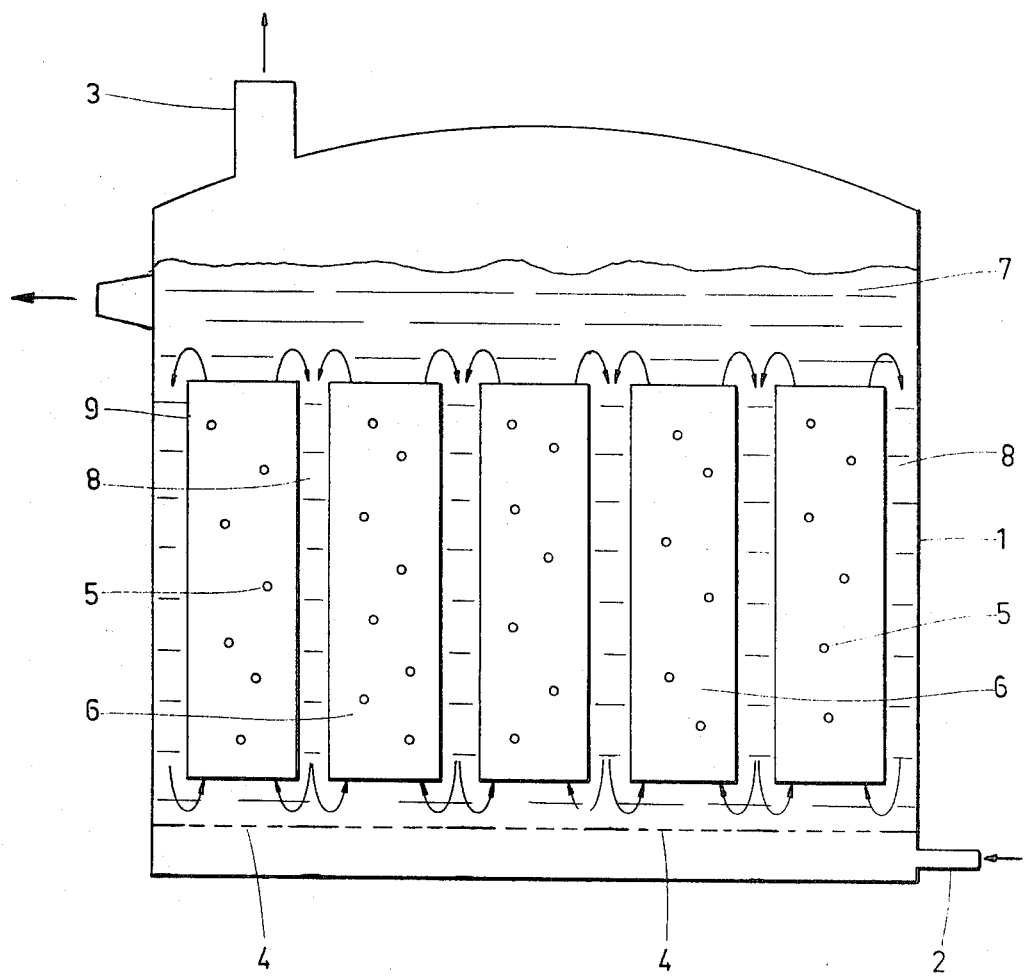
FIG. 1 is a cross-sectional vertical view of a cylindrical tank or enclosure according to one embodiment of the invention.

Referring back to FIG. 1, the cylindrical enclosure or container 1 is provided at its lower part with an inlet duct 2 for admission of air, which, after contact with the liquid phases, is discharged through duct 3.

The enclosure is also provided with inlet and outlet ducts for the liquids (not shown).

The air introduced through duct 2 passes through the perforations 4 and rises in the form of bubbles such as 5 through zones of the first type 6 wherein is effected a stirring of the two liquid phases with the gas and a stripping by the gas of the resulting mixture towards the upper part of each of the substantially vertical elongated zones of the first type 6. As seen from the drawings, air is the sole source of agitation.

In this enclosure the whole of said zones of the first type is surmounted with a liquid phase containing common zone 7 wherein is carried out an at least partial separation of air from the liquid mixture, the air impoverished in oxygen evolving from the enclosure through duct 3.

The liquid mixture then flows down to the base of the enclosure throught the elongated zone of the second type 8, before being again stirred and carried along with a new air stream.

The hollow partition 9 separates the above-mentioned zones.

Figure 2:
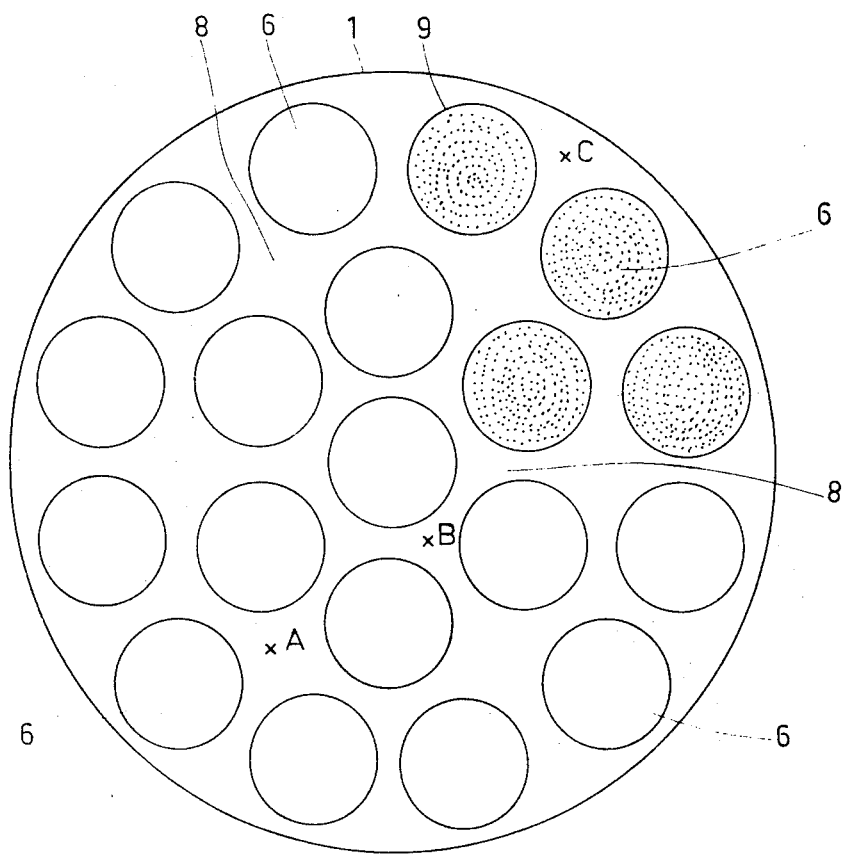
FIG. 2 is a horizontal cross-section of the apparatus of FIG. 1 at half-level thereof.

FIG. 2 shows in a horizontal cross section the various elongated zones of type 6 surrounded with a single zone of second type 8.

Considering three points A, B and C in that plane, the composition of mixture at these points is substantially the same.

The ratio of the total surface of the different zones of first type 6 to the surface of the zone of type 8 in a horizontal secional plane (such as that of the cross-section shown) is advantageously between 0.5 and 2 and preferably between 0.8 and 1.2. (For the sake of clarity of the drawings this ratio as shown in FIG. 2 is not to scale.)

Figure 3:
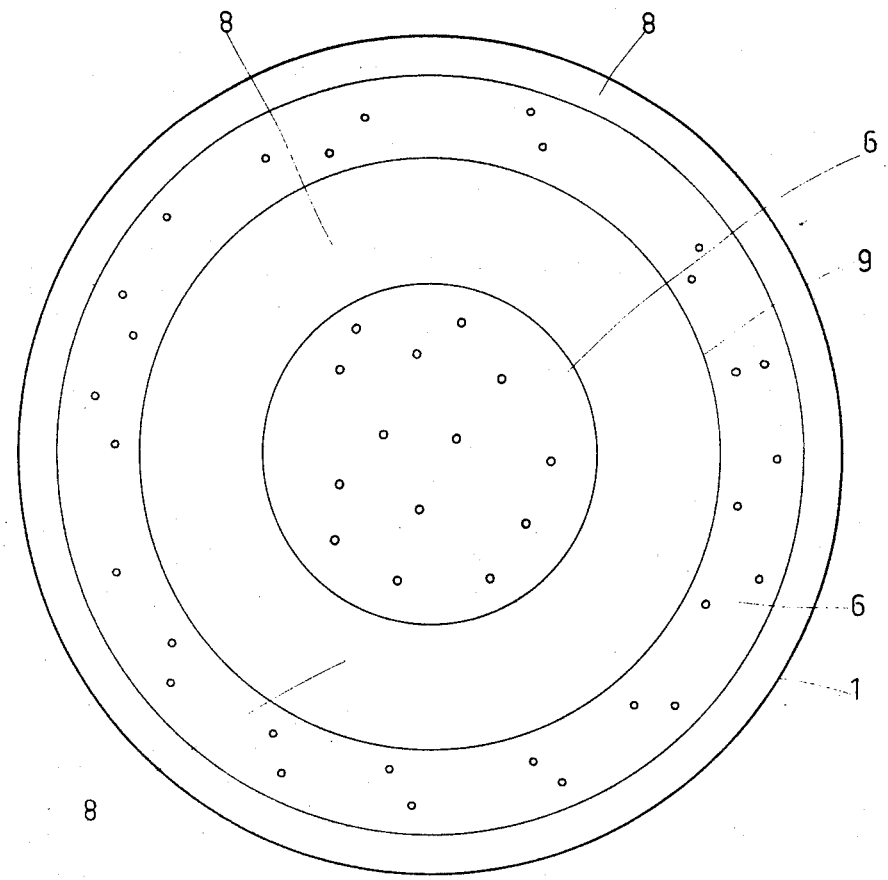
FIG. 3 is an horizontal cross-section of an enclosure which is a variant of that of FIG. 1.

In the variant shown in FIG. 3 the elongated zones of the first type 6 are concentric to one another and with the zones of the second type 8.

Figure 4:
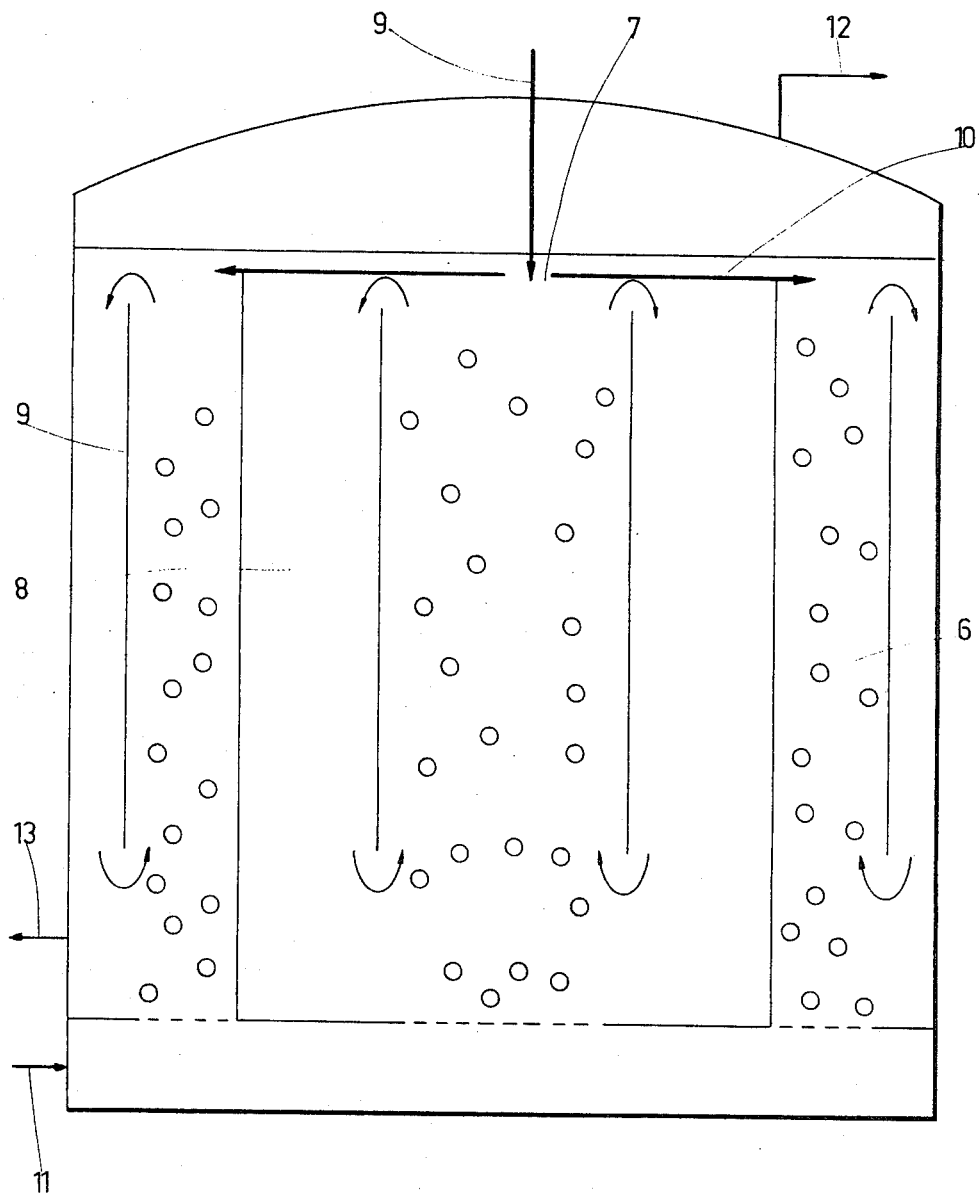
FIG. 4 shows a vertical cross-section of the enclosure of FIG. 3.

In the vertical cross-section of this embodiment illustrated in FIG. 4, the curved arrows at the upper part show the direction of the liquid flow passing by overflow from a zone 6 to a zone 8 through a zone 7.

The liquid being supplied to the tank or enclosure at the top thereof (vertical arrow 9), the horizontal arrows such as 10 show the overall direction of the liquids circulation.

Lines 11, 12 and 13 are respectively provided for fresh air supply, withdrawal of used up air and discharge of the liquid mixture.

A portion of hollow partition such as 9 (FIGS. 1, 2, 3, and 4), is shown in enlarged cross sections in FIGS. 5, 6 and 7. The partition is delimited by surfaces 23 and 27 which may be parallel (FIG. 7) or of various shapes (FIGS. 5 and 6). In the latter case, connection points 24 subdivide the partition into separate or communicating compartments. In the case of separate compartments communication points may be provided from place to place, or the hollow sections of a cylindrical partition may form a helix, the cooling fluid flowing through said partition along a helical direction.

On the contrary the cooling fluid, in the embodiment of FIG. 7, will circulate, as an average, along a vertical direction upwardly or downwardly.

The arrow 25 shows the upward flow of the liquid phase on one side of the partition and the arrow 26 shows the downward flow on the other side of the partition.

As already stated, the apparatus, such as hereabove described, is particularly suitable for the culture of microorganisms and more specially of yeasts on hydrocarbon substrates such as paraffin or gas oil optionally enriched in straight-chain paraffins.

What we claim as this invention is:

1. A process for cultivating microorganisms in a nutritive liquid phase, comprising conducting said cultivating in an enclosure provided with vertical partitions subdividing the enclosure into a plurality of vertical elongated zones communicating with one another at their top and at their base, one group of said zones being fed with air at their base, so as to carry along the liquid phase of culture upwardly, said group being surmounted by a common liquid-phase-containing zone interconnecting said zones of said group for at least partially separating air from the liquid phase, said common zone containing a mixture having substantially the same composition at diverse points of the same plane; said air being the only source of agitation for said cultivating process, another group of said zones being not fed with air and being used for the downward flow of the liquid phase, at least one part of said vertical partitions being hollow and having a cooling liquid passing therethrough the ratio between the total surface of the hollow partitions and the total volume of the vertical elongated zones delimited thereby being between 0.1 and 10 m.$^2$ per m.$^3$.

2. A process according to claim 1 wherein the mean thickness of each hollow partition is between 0.5 cm. and 20 cm.

3. A process according to claim 1, wherein the ratio of the total surface of the liquid phase ascending zones to the total surface of the liquid phase descending zones, in a horizontal sectional plane, is between 0.5 and 2.

4. A process according to claim 3, wherein the ratio of the total surface of the liquid phase ascending zones to the total surface of the liquid phase descending zones, in a horizontal sectional plane, is between 0.8 and 1.2.

5. A process according to claim 1, wherein the hollow partitions are subdivided in sections having a generally helical shape.

6. A process according to claim 4 wherein the mean thickness of each hollow partition is between 0.5 cm. and 20 cm.

References Cited

UNITED STATES PATENTS

| 2,188,192 | 1/1940 | Scholler et al. | 195—94 |
| 3,400,051 | 9/1968 | Hofschneider | 195—142 |
| 3,460,810 | 8/1969 | Mueller | 259—96 |

RAYMOND N. JONES, Primary Examiner

R. B. ANDEWELT, Assistant Examiner

U.S. Cl. X.R.

195—142, 141, 82